(12) United States Patent
Fukawatase

(10) Patent No.: US 9,033,367 B2
(45) Date of Patent: May 19, 2015

(54) VEHICLE COLLISION DAMAGE MITIGATION SYSTEM

(71) Applicant: Toyota Jidosha Kabushiki Kaisha, Toyota-shi Aichi-ken (JP)

(72) Inventor: Osamu Fukawatase, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/314,647

(22) Filed: Jun. 25, 2014

(65) Prior Publication Data
US 2014/0375036 A1  Dec. 25, 2014

(30) Foreign Application Priority Data

Jun. 25, 2013  (JP) ................................. 2013-132667

(51) Int. Cl.
*B60R 21/16* (2006.01)
*B60K 28/14* (2006.01)
*B60R 21/0136* (2006.01)
*B60R 21/00* (2006.01)

(52) U.S. Cl.
CPC ..... *B60R 21/0136* (2013.01); *B60R 2021/0004* (2013.01); *B60R 2021/0023* (2013.01)

(58) Field of Classification Search
CPC ................... B60R 21/0136; B60R 2021/0004; B60R 2021/0023
USPC .............. 280/732, 734, 752; 180/274; 701/45
See application file for complete search history.

(56) References Cited

U.S. PATENT DOCUMENTS

| 4,518,183 | A | * | 5/1985 | Lee ................................. 293/118 |
| 6,097,332 | A | * | 8/2000 | Crosby, II ........................ 342/72 |
| 6,327,527 | B1 | * | 12/2001 | Imai et al. ........................ 701/45 |
| 6,416,093 | B1 | * | 7/2002 | Schneider ..................... 293/107 |
| 6,424,899 | B2 | * | 7/2002 | Imai et al. ........................ 701/45 |
| 6,463,372 | B1 | | 10/2002 | Yokota et al. |
| 6,560,520 | B2 | * | 5/2003 | Yokota et al. .................... 701/45 |
| 6,773,044 | B2 | * | 8/2004 | Schambre et al. ............. 293/118 |
| 6,950,014 | B2 | * | 9/2005 | Rao et al. ....................... 340/438 |
| 7,185,728 | B2 | * | 3/2007 | Makita et al. .................. 180/274 |
| 7,416,043 | B2 | * | 8/2008 | Pipkorn et al. ................ 180/274 |
| 7,418,345 | B2 | * | 8/2008 | Diebold et al. ............... 701/301 |
| 7,527,121 | B2 | * | 5/2009 | Kitte et al. .................... 180/274 |
| 7,905,314 | B2 | * | 3/2011 | Mathevon et al. ............ 180/274 |
| 2005/0161273 | A1 | | 7/2005 | Makita et al. |

(Continued)

FOREIGN PATENT DOCUMENTS

| JP | 2001-058552 A | 3/2001 |
| JP | 2005-212551 A | 8/2005 |
| JP | 2008-195261 A | 8/2008 |

*Primary Examiner* — Paul N Dickson
*Assistant Examiner* — Darlene P Condra
(74) *Attorney, Agent, or Firm* — Gifford, Krass, Sprinkle, Anderson & Citkowski, P.C.

(57) ABSTRACT

A vehicle collision damage mitigation system includes: a vehicle having a crashable zone on a front side of a dash panel in a vehicle longitudinal direction; a body airbag device that inflates a body airbag that is provided on a front surface of the dash panel by a pressure of gas generated by a gas generating device; a detector that detects whether a mode of a frontal collision of the vehicle is a full-overlap collision or another collision; and a control unit that operates the gas generating device when detecting a collision other than the full-overlap collision on the basis of a detection result of the detector and that does not operate the gas generating device when detecting the full-overlap collision.

11 Claims, 8 Drawing Sheets

(56) References Cited

U.S. PATENT DOCUMENTS

| | | | |
|---|---|---|---|
| 2008/0119984 A1* | 5/2008 | Hrovat et al. | 701/38 |
| 2010/0230644 A1* | 9/2010 | Ryoshi et al. | 252/512 |
| 2011/0040452 A1* | 2/2011 | Tsunekawa et al. | 701/45 |
| 2011/0042978 A1* | 2/2011 | Elhadary | 294/1.3 |
| 2012/0298438 A1* | 11/2012 | Lee et al. | 180/274 |
| 2013/0200603 A1* | 8/2013 | Bergenheim et al. | 280/762 |
| 2013/0278013 A1* | 10/2013 | Baccouche et al. | 296/187.1 |

\* cited by examiner

VEHICLE COLLISION DAMAGE MITIGATION SYSTEM

INCORPORATION BY REFERENCE

The disclosure of Japanese Patent Application No. 2013-132667 filed on Jun. 25, 2013 including the specification, drawings and abstract is incorporated herein by reference in its entirety.

BACKGROUND OF THE INVENTION

1. Field of the Invention

The present invention relates to a vehicle collision damage mitigation system for mitigating collision damage of an automobile.

2. Description of Related Art

In a vehicle collision damage mitigation system that is disclosed in Japanese Patent Application Publication No. 2001-058552 (JP 2001-058552 A), a body airbag housed in a case that can increase a volume and has a nested structure is provided on an engine room side of a partition wall that partitions an engine room and a vehicle cabin. Since this body airbag is inflated before a collision on the basis of collision prediction information, collision energy is absorbed by plastic deformation of the case and deformation of the airbag.

A vehicle body front section of an automobile has a slightly more flexible structure than the vehicle cabin, and serves as a crashable zone that is deformed to absorb the collision energy in a frontal collision. However, in the above vehicle collision damage mitigation system, there may be a case where absorption of the collision energy by the deformed crashable zone is interfered by the body airbag and the case that are inflated in the frontal collision.

SUMMARY OF THE INVENTION

The present invention provides a vehicle collision damage mitigation system that can appropriately mitigate collision damage of a vehicle in accordance with a mode of a frontal collision.

A first aspect of the present invention relates to a vehicle collision damage mitigation system. The vehicle collision damage mitigation system includes: a vehicle having a crashable zone on a front side of a dash panel in a vehicle longitudinal direction; a body airbag device that inflates a body airbag that is provided on a front surface of the dash panel by a pressure of gas generated by a gas generating device; a detector that detects whether a mode of a frontal collision of the vehicle is a full-overlap collision or another collision; and a control unit that operates the gas generating device when detecting a collision other than the full-overlap collision on the basis of a detection result of the detector and that does not operate the gas generating device when detecting the full-overlap collision.

In the above embodiment, when the vehicle is involved in the frontal collision, the control unit detects whether the mode of the frontal collision is the full-overlap collision (a symmetric collision) or another collision (an asymmetric collision such as an oblique collision, an offset collision, or a small overlap collision) on the basis of a detection result of the detector. When a collision other than the full-overlap collision is detected, a collision load is concentrated on a collision side (one of right and left sides) of a vehicle body front section. Thus, in order to suppress deformation of the collision side, the control unit operates the gas generating device. Then, the body airbag that is provided on the front surface of the dash panel is inflated by the pressure of the gas generated from the gas generating device, and collision energy is absorbed by the body airbag. Accordingly, it is possible to suppress excessive deformation of the collision side of the vehicle body front section.

Meanwhile, when the mode of the frontal collision of the vehicle is the full-overlap collision, both of right and left sides of the vehicle body front section, which serve as the crashable zone, are deformed in a well-balanced manner. Thus, the collision energy is absorbed efficiently. At this time, since the control unit does not operate the gas generating device, it is possible to prevent the deformation of the crashable zone from being interfered by the inflation of the body airbag. From what has been described so far, according to the first aspect of the present invention, the collision damage of the vehicle can appropriately be mitigated in accordance with the mode of the frontal collision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will be made on a vehicle collision damage mitigation system 10 according to an embodiment of the present invention with reference to FIG. 1 to FIG. 8. It should be noted that an arrow FR, an arrow UP, and an arrow OUT that are appropriately shown in each drawing respectively indicate a front direction (a traveling direction), an upward direction, and an outer side in a vehicle width direction of a vehicle. When a description will hereinafter be made simply by using front/rear, up/down, and right/left directions, these directions respectively indicate the front/rear in a vehicle longitudinal direction, the up/down in a vehicle up-and-down direction, and the right/left in the traveling direction unless otherwise specified.

(Configuration)

Figure 1:
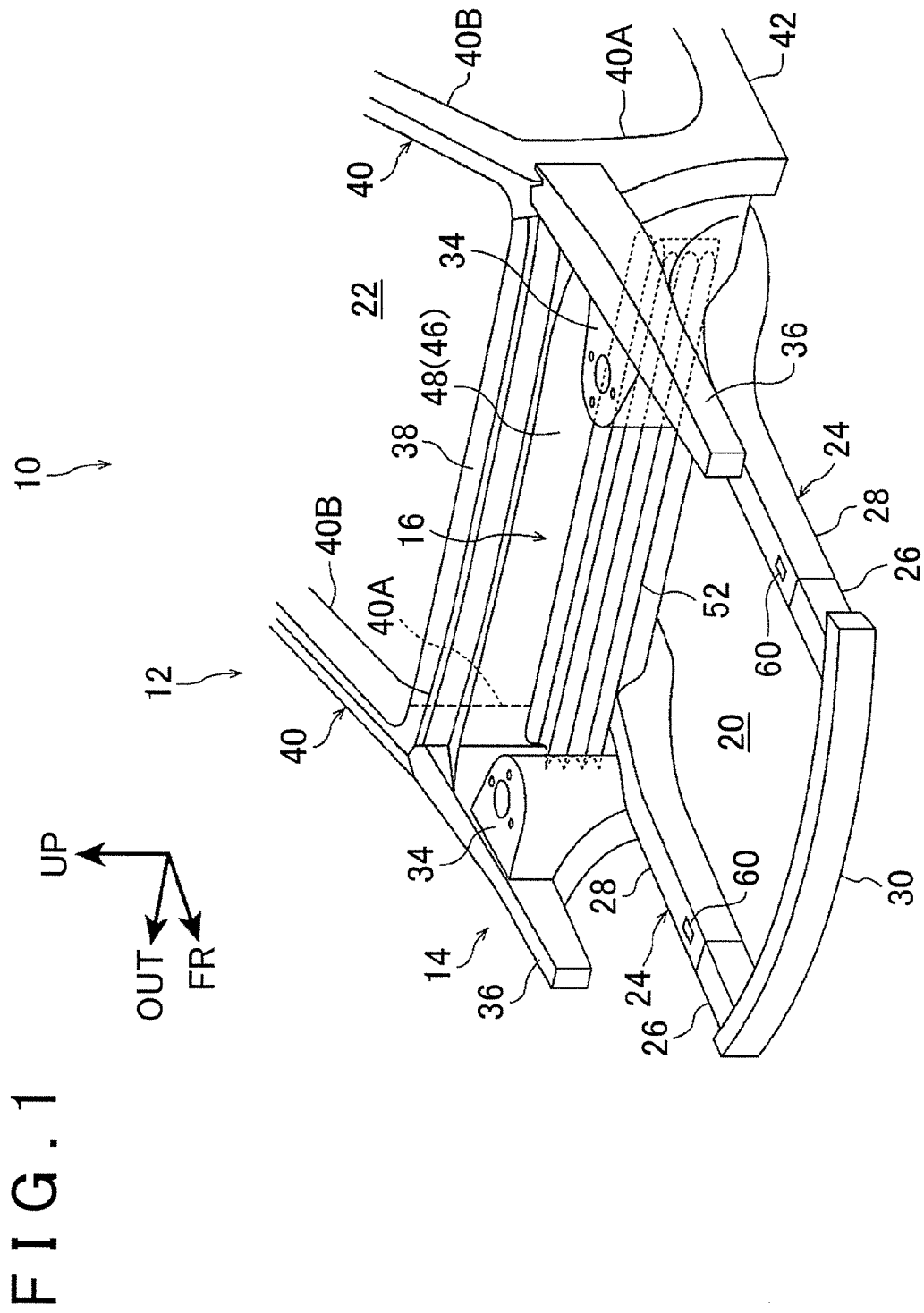
FIG. 1 is a perspective view for showing a partial configuration of a vehicle body front section of an automobile to which a vehicle collision damage mitigation system according to an embodiment of the present invention is applied.
Figure 2:
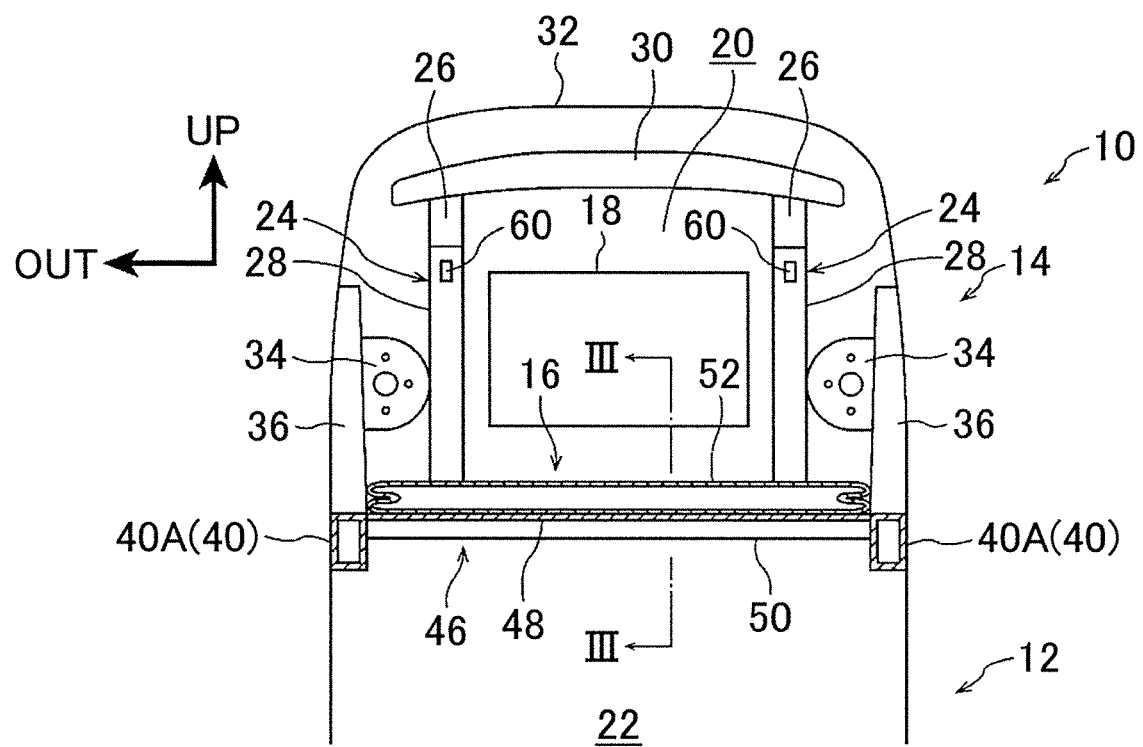
FIG. 2 is a plan view of the vehicle body front section of the automobile to which the vehicle collision damage mitigation system according to the embodiment of the present invention is applied.

As shown in FIG. 1 and FIG. 2, in the vehicle collision damage mitigation system 10 according to this embodiment, a body airbag device 16 is installed in a vehicle body front section 14 of an automobile 12 as the vehicle. This automobile 12 is a sedan type, for example, and an engine compartment 20 for housing a power unit 18 (not shown in FIG. 1) that is configured by including an engine, a motor, and the like is formed on a vehicle front side of a cabin 22 (a vehicle cabin). A right and left pair of front side members 24 is provided on both sides in the vehicle width direction in a lower portion of the engine compartment 20.

The right and left front side members 24 are frame members of the vehicle body that are formed in a rectangular closed sectional shape when seen in the vehicle longitudinal direction, and are arranged on both sides of the vehicle body front section 14 with the vehicle longitudinal direction as a longitudinal direction thereof. An engine mount, which is not shown, is attached to an upper surface of each of the right and left front side members 24, and the power unit 18 is supported by the right and left front side members 24 via each of the engine mounts.

Crash boxes 26 that serve as impact absorbing sections are provided in front of the right and left front side members 24. These crash boxes 26 are separately formed from main body sections 28 of the front side members 24, and are fixed to front ends of the main body sections 28 by means such as bolt fastening.

Each of the right and left crash boxes 26 is formed in a rectangular closed sectional shape when seen in the vehicle longitudinal direction, for example, and rigidity (strength) thereof with respect to an axial compression load along the vehicle longitudinal direction is set to be lower than that of the main body section 28. In the frontal collision of the automobile 12, each of the crash boxes 26 is configured to be deformed before the main body section 28 is deformed, and thereby absorbs the energy. A bumper reinforcement 30 that is arranged in the vehicle body front section 14 with the vehicle width direction as a longitudinal direction thereof is fixed to a front end of each of the right and left crash boxes 26 by the means such as the bolt fastening.

The bumper reinforcement 30 is of so-called B-shaped cross section type whose cross section is formed in a substantially B shape when seen in the vehicle width direction, for example. An absorber (a cushioning material) that is not shown and is formed of a foamed body or the like is attached to a front end surface of the bumper reinforcement 30, and the absorber and the bumper reinforcement 30 are configured to be covered by a bumper cover 32.

In both sides in the vehicle width direction of the engine compartment 20, a right and left pair of suspension towers 34 is respectively provided on vehicle body upper sides of the right and left front side members 24. The right and left suspension towers 34 are respectively supported by the right and left front side members 24. The right and left suspension towers 34 support an upper portion of a suspension device, which is not shown, and a suspension arm that is included in the suspension device is supported by a suspension member that is not shown and is attached to a lower surface of each of the right and left front side members 24.

In addition, upper ends of the right and left suspension towers 34 are respectively coupled to right and left apron upper members 36 that extend in the vehicle longitudinal direction on the vehicle upper side of the right and left front side members 24 and on the outer side in the vehicle width direction. Rear ends of the right and left apron upper members 36 are respectively coupled to ends on both sides in the vehicle width direction of a cowl 38 that extends in the vehicle width direction. The cowl 38 is provided in a boundary portion between the cabin 22 and the engine compartment 20.

Both of the ends in the vehicle width direction of the cowl 38 are respectively coupled to right and left front pillars 40. Each of the right and left front pillars 40 is configured by a pillar lower 40A that extends in the vehicle up-and-down direction and a pillar upper 40B that extends from an upper end of the pillar lower 40A to the vehicle upper side and a vehicle rear side. A rear end of the above-mentioned apron upper member 36 is coupled to a connected portion between the pillar lower 40A and the pillar upper 40B in the each front pillar 40. In addition, a front end of a rocker 42 that extends in the vehicle longitudinal direction is coupled to a lower end of the each pillar lower 40A.

A dash panel 46 for partitioning (dividing) the cabin 22 and the engine compartment 20 is provided on a vehicle body lower side of the cowl 38. The dash panel 46 includes a panel main body 48 with the vehicle longitudinal direction as a panel thickness direction, and an upper end of the panel main body 48 is coupled to a lower end of the cowl 38.

Figures 3A, 3B:
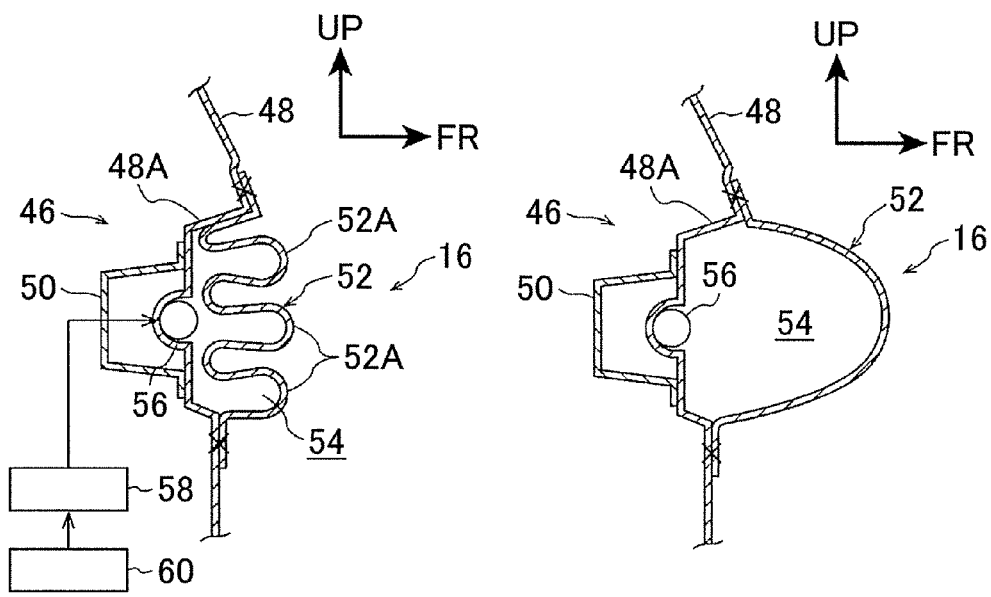
FIG. 3A is an enlarged cross-sectional view for showing a cross section taken along the line III-III in FIG. 2.
FIG. 3B is an enlarged cross-sectional view that corresponds to FIG. 3A and shows a state in which a body airbag is inflated.

As shown in FIG. 3A, a dash cross member 50 (not shown in FIG. 1) for reinforcing the panel main body 48 is coupled to an intermediate portion in the up-and-down direction of the panel main body 48. The dash cross member 50 is a frame member of the vehicle body with the vehicle width direction as a longitudinal direction thereof, both ends thereof in the vehicle width direction are respectively coupled to the right and left front pillars 40, and the dash cross member 50 is thereby stretched between the right and left front pillars 40. The dash cross member 50 has a hat-shaped cross section in which a vehicle body front side thereof is opened when seen in a vehicle body width direction, and upper and lower flange sections are joined to the panel main body 48 by means such as spot welding.

In this embodiment, a portion of the panel main body 48 to which the dash cross member 50 is joined is formed with a rear swollen section 48A that protrudes to the vehicle rear side. The rear swollen section 48A is formed to have an opened cross section in which a vehicle front side thereof is opened, and is also formed longitudinally along the vehicle width direction. The rear swollen section 48A is formed in a longitudinal shape that extends from one end in the vehicle width direction of the dash panel 46 to another end in the vehicle width direction thereof.

In the automobile 12 that is configured as above, a portion in front of the dash panel 46, that is, the vehicle body front section 14 serves as the crashable zone. Thus, it is configured that, when the automobile 12 is involved in the frontal collision (a head-on collision), the crash boxes 26, the front side members 24, and the like are actively deformed to inhibit deformation of the cabin 22 on the rear side, and thereby absorb the collision energy. Such a configuration can be realized by a known method such as forming a bead in the front side member 24.

Next, a description will be made on a body airbag device 16 that is a main component of this embodiment.

As shown in FIG. 3A, the body airbag device 16 includes a body airbag 52 that is disposed on a front surface of the dash panel 46. The body airbag 52 is formed of a metallic sheet and is arranged in a position to overlap with the rear swollen section 48A and the dash cross member 50 when seen in the vehicle longitudinal direction.

A length dimension in the vehicle width direction of the body airbag 52 is set to be longer than that of the rear swollen section 48A. A peripheral edge of the body airbag 52 is joined to an opening edge of the rear swollen section 48A by means such as welding. Accordingly, a sealed space 54 is formed by the body airbag 52 and the rear swollen section 48A. As shown in FIG. 3A, the body airbag 52 has a cross section that is bent in a wave shape (a shape in which plural S shapes are continued), and includes plural extra length sections 52A that are aligned in the up-and-down direction.

In addition, both ends in the vehicle width direction of the body airbag 52 are interposed between each of the right and left suspension towers 34 and each of the right and left front pillars 40. In other words, the end on the vehicle left side of the body airbag 52 is located between the suspension tower 34 and the front pillar 40 on the vehicle left side while the end on the vehicle right side of the body airbag 52 is located between the suspension tower 34 and the front pillar 40 on the vehicle right side.

Meanwhile, as shown in FIG. 3A, an inflator 56 (a gas generating device) that is a component of the body airbag device 16 is provided in the above-mentioned sealed space 54. The inflator 56 is of so-called cylinder type and is arranged such that an axial direction thereof follows the vehicle width direction. A portion of the rear swollen section 48A that faces the inflator 56 is formed with an inflator housing section that is swollen to protrude to the vehicle body rear side, and the inflator 56 is housed in the inflator housing section. The inflator 56 is fixed to the rear swollen section 48A by the stud bolt that penetrates the rear swollen section 48A being screwed to a nut, for example.

Figure 4:
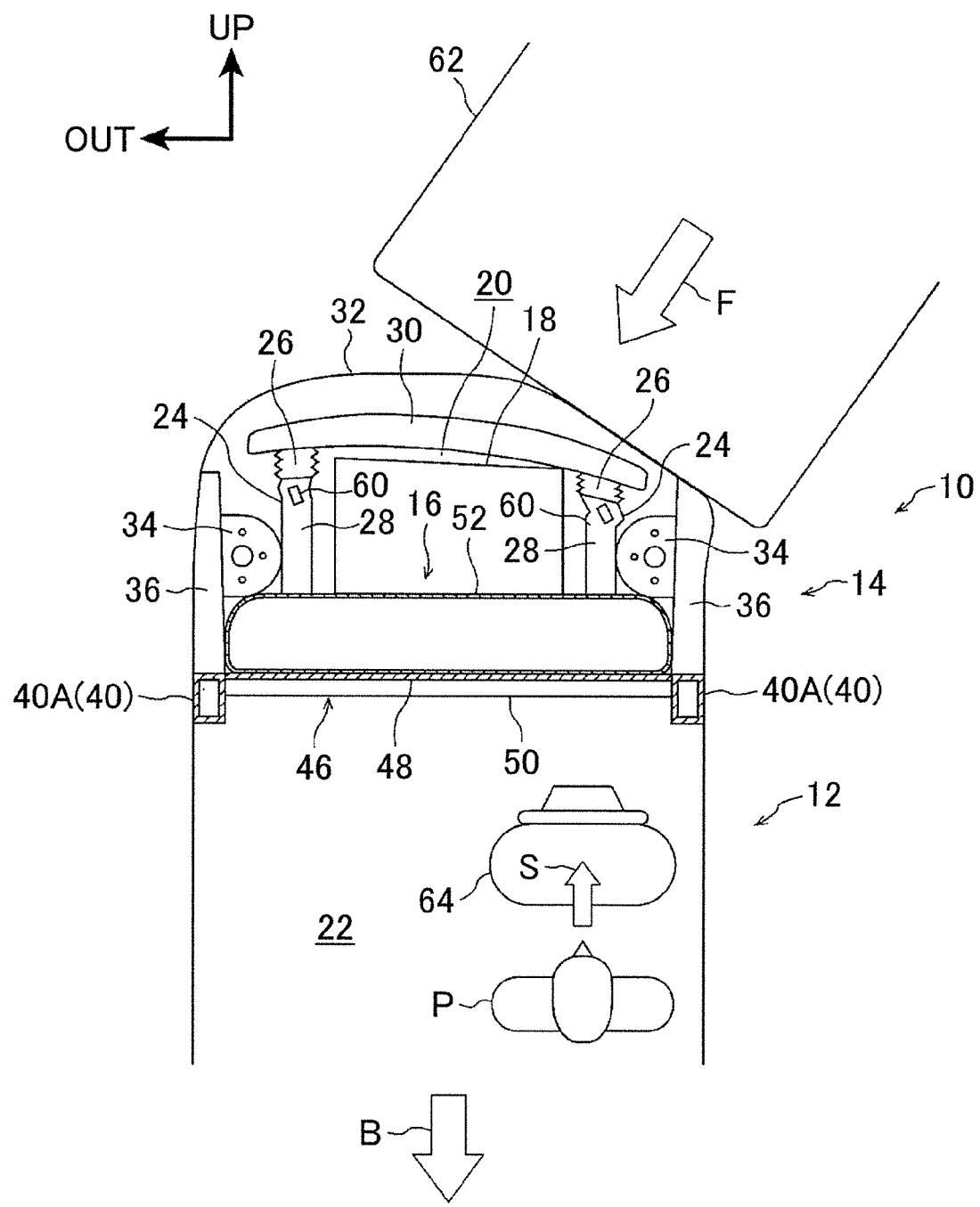
FIG. 4 is a plan view that corresponds to FIG. 2 and shows a state in which the automobile according to this embodiment of the present invention is involved in an oblique collision.

Once the inflator 56 is operated, gas is jetted from a gas jetting port that is not shown and is provided on an outer periphery of the inflator 56. Accordingly, when a pressure inside the sealed space 54 is increased, as shown in FIG. 3B, the extra length sections 52A of the body airbag 52 are stretched, and the body airbag 52 is inflated to the vehicle front side as shown in FIG. 3B and FIG. 4. The size of the body airbag 52 is set such that a front surface of the body airbag 52 contacts a rear surface of the power unit 18 and rear surfaces of the right and left suspension towers 34 at this time.

As shown in FIG. 3A, an airbag ECU 58 (a control unit) that is installed in the vehicle is electrically connected to the above-mentioned inflator 56. A right and left pair of satellite sensors 60 (collision sensors) that is respectively attached to the right and left front side members 24 is electrically connected to the airbag ECU 58. Each of the right and left satellite sensors 60 constitutes a detector for detecting whether a mode of the frontal collision of the automobile 12 is either a full-overlap collision (symmetric collision) or another type of collision (asymmetric collision such as an oblique collision, an offset collision, or a small overlap collision).

The airbag ECU 58 compares deviation of input timing of signals from the right and left satellite sensors 60 as well as magnitudes of output signals from the right and left satellite sensors 60, thereby determining whether the mode of the frontal collision is the full-overlap collision or another collision. If the airbag ECU 58 detects a collision other than the full-overlap collision on the basis of the signals (detection results) from the right and left satellite sensors 60, the inflator 56 is operated by the airbag ECU 58. On the other hand, it is configured that, if the airbag ECU 58 detects the full-overlap collision on the basis of the signals from the right and left satellite sensors 60, the inflator 56 is not operated by the airbag ECU 58. For example, it may be configured that the oblique collision is detected on the basis of a signal from a front/rear acceleration sensor for detecting acceleration in the vehicle longitudinal direction as well as a signal from a right/left acceleration sensor for detecting acceleration in a vehicle right-and-left direction.

(Operations and Effects)

Next, operations and effects of this embodiment will be described.

In the vehicle collision damage mitigation system 10 that is configured as above, when the automobile 12 is involved in the frontal collision, the airbag ECU 58 detects whether the mode of the frontal collision is the full-overlap collision or another collision on the basis of the signals from the right and left satellite sensors 60. Then, based on this detection result, the airbag ECU 58 determines presence or absence of the operation of the body airbag device 16.

Figure 5:
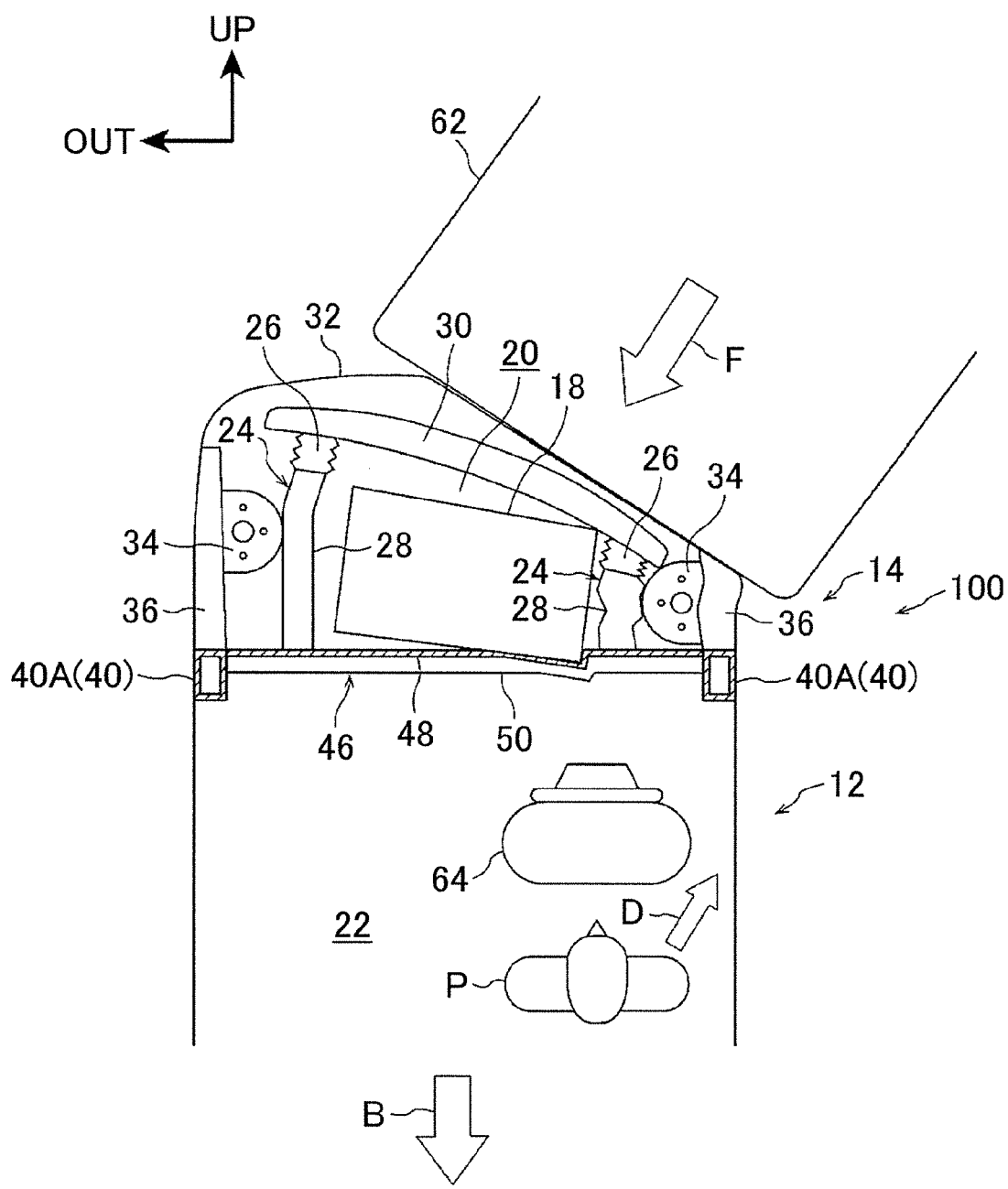
FIG. 5 is a plan view that corresponds to FIG. 4 and shows a state in which the automobile according to a comparative example is involved in the oblique collision.

For example, as shown in FIG. 4, when the automobile 12 is involved in the oblique collision with another vehicle 62, a collision load F is concentrated on a collision side (here, the vehicle body right side) of the vehicle body front section 14. Thus, in order to suppress deformation of the collision side, the airbag ECU 58 operates the inflator 56. Then, the body airbag 52, which is provided on the front surface of the dash panel 46, is inflated by a pressure of the gas generated from the inflator 56, and the collision energy is absorbed by the body airbag 52. Accordingly, it is possible to suppress the excessive deformation of the collision side of the vehicle body front section 14. In other words, as in a comparative example 100 that is shown in FIG. 5, if the body airbag device 16 is not provided, the collision side of the vehicle body front section 14 is excessively deformed, and a retreat amount of the power unit 18 or the like is possibly increased. However, this can be suppressed in this embodiment.

In addition, for example, even when the other vehicle 62 obliquely collides with the parked automobile 12 (a host vehicle) as shown in FIG. 4, the excessive deformation of the collision side of the vehicle body front section 14 is suppressed, and thus the automobile 12 can promptly be moved to the rear by the collision energy (see an arrow B in FIG. 4). At this time, since a passenger P in the automobile 12 tends to be displaced straight forward with respect to the vehicle body by inertia (see an arrow S in FIG. 4), it is possible to favorably restrain the passenger P with a front seat airbag 64 (a driver seat airbag or a passenger seat airbag). More specifically, as in the comparative example 100 that is shown in FIG. 5, when a magnitude of deformation of the vehicle body front section 14 is increased, the passenger P may move inertially in an opposite direction (see an arrow D in FIG. 5) from an input direction of the collision load F, that is, obliquely to the front of the vehicle body. In this case, the passenger P is thrust against the front seat airbag 64 obliquely. However, since the front seat airbag 64 can receive the passenger P in a straight manner in this embodiment, passenger protection function by the front seat airbag 64 can be improved.

Figure 6:
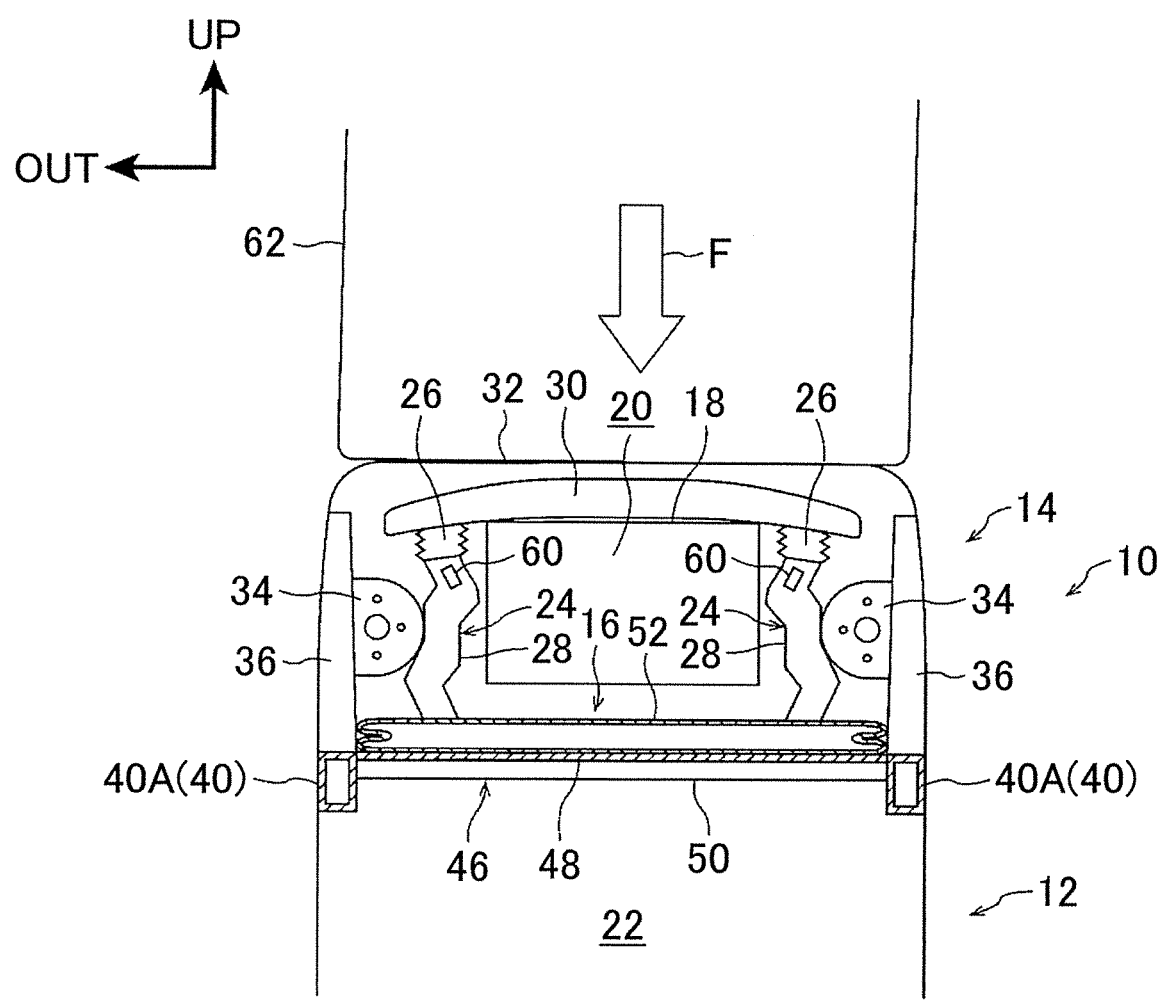
FIG. 6 is a plan view that corresponds to FIG. 2 and shows a state in which the automobile according to this embodiment of the present invention is involved in a full-overlap collision.
Figure 7:
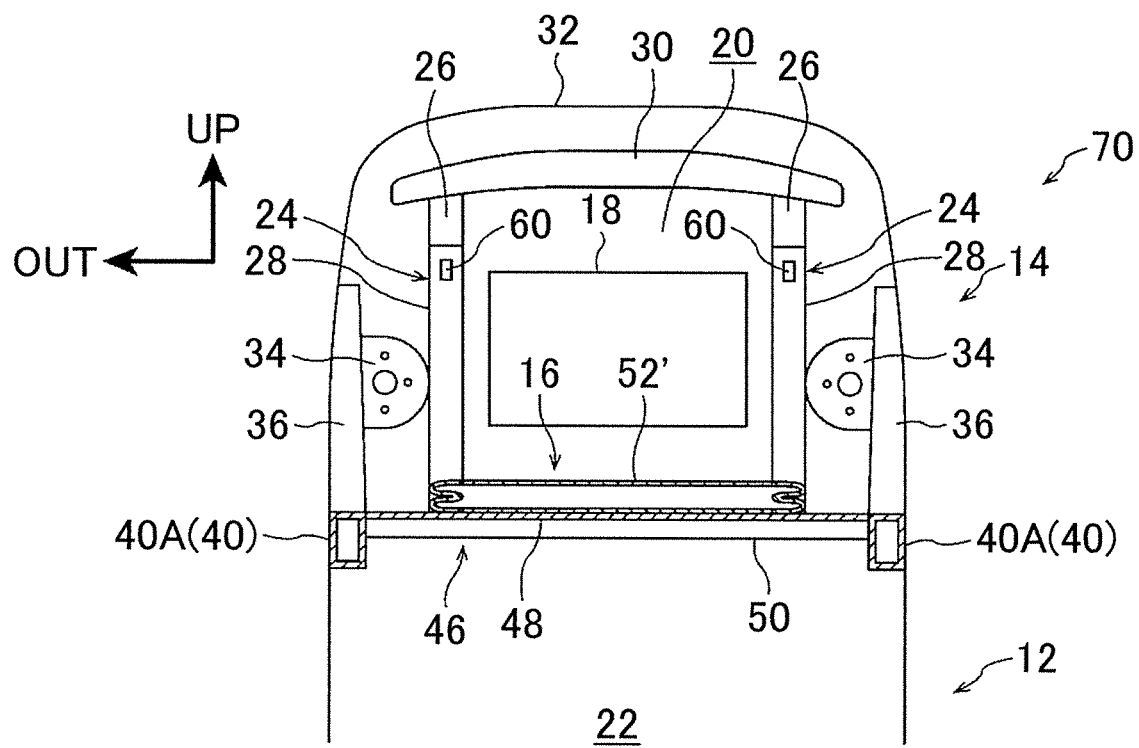
FIG. 7 is a plan view that corresponds to FIG. 2 and shows a modified example of this embodiment of the present invention.

Meanwhile, as shown in FIG. 6, when the mode of the collision of the automobile 12 is the full-overlap collision, both of the right and left sides of the vehicle body front section 14, which serves as the crashable zone, are deformed in a well-balanced manner. Thus, the collision energy is absorbed efficiently. At this time, since the airbag ECU 58 does not operate the inflator 56, it is possible to inhibit the deformation of the crashable zone from being interfered by the inflation of the body airbag 52. From what has been described so far, according to this embodiment, the collision damage of the automobile 12 can appropriately be mitigated in accordance with the mode of the frontal collision. In addition, the configuration that uses the body airbag device 16 is adopted.

Thus, compared to a configuration in which the rigidity of the vehicle body itself is improved to suppress the deformation of the vehicle body, it is possible to suppress an increase in the vehicle body weight.

Furthermore, in this embodiment, the body airbag 52 is disposed in the position that overlaps with the dash cross member 50 when seen in the vehicle longitudinal direction. Accordingly, when a load is input from the vehicle front side to the inflated body airbag 52, the body airbag 52 can favorably be supported by the dash cross member 50. In addition, supporting rigidity for the body airbag 52 can also be favorable at a normal time.

Moreover, in this embodiment, both of the ends in the vehicle width direction of the body airbag 52 are respectively interposed between the right and left suspension towers 34 and the right and left front pillars 40. Accordingly, when the body airbag 52 is inflated, a space between the left suspension tower 34 and the left front pillar 40 and a space between the right suspension tower 34 and the right front pillar 40 can be filled by both of the ends in the vehicle width direction of the body airbag 52 (see FIG. 4). As a result, the rigidity of both of the suspension tower 34 and the front pillar 40 can efficiently be used, and thus the deformation of the vehicle body front section 14 can effectively be suppressed.

In this embodiment, since the body airbag 52 is made of metal, it is possible to prevent or suppress breakage of the body airbag 52 that can be caused by interference with the power unit 18 and the like. In addition, the body airbag 52 also functions as a reinforcing member for reinforcing the vehicle body front section 14.

<Supplemental Description of Embodiment>

In the above embodiment, it is configured that the body airbag 52 is made of metal; however, the present invention is not limited thereto, and the configuration of the body airbag can appropriately be changed. For example, like the body airbag described in BACKGROUND OF THE INVENTION, it may be configured that a bag main body is formed of a base cloth made of fabric and is housed in a case, a volume of which can be increased. In addition, for example, a pressure resistant bag that is formed of a base cloth made of thick rubber in which reinforcing metal meshes are laminated in layers may be adopted as the body airbag.

In the above embodiment, it is configured that both of the ends in the vehicle width direction of the body airbag 52 are respectively interposed between the right and left suspension towers 34 and the right and left front pillars 40; however, the present invention is not limited thereto. As in a modified example 70 shown in FIG. 7, it may be configured that both of the ends in the vehicle width direction of the body airbag 52 are located on the inner side of the right and left suspension towers 34 in the vehicle width direction.

Figure 8A:
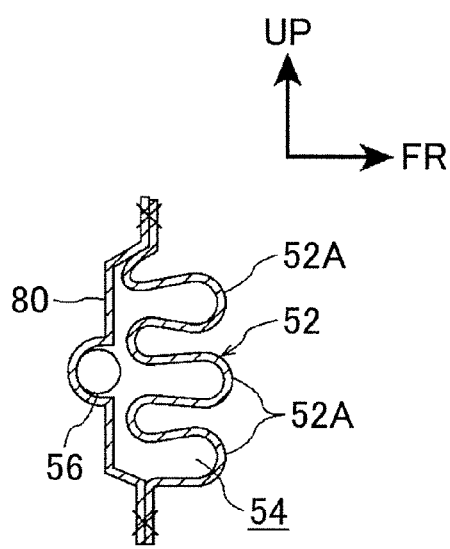
FIG. 8A is a cross-sectional view that corresponds to FIG. 3A and shows the modified example of the body airbag of this embodiment of the present invention.
Figure 8B:
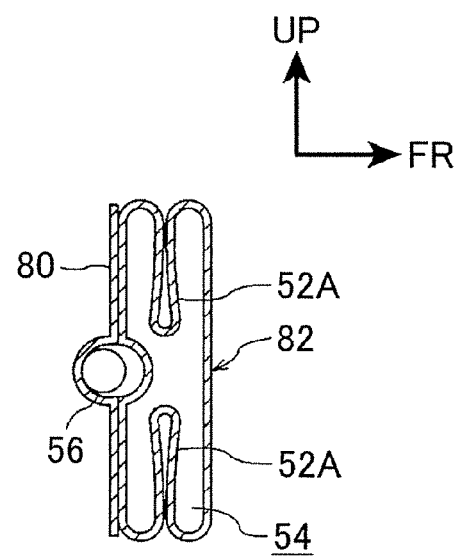
FIG. 8B is a cross-sectional view that corresponds to FIG. 3A and shows the modified example of the body airbag of this embodiment of the present invention.

In the above embodiment, it is configured that the body airbag 52 fauns the sealed space 54 together with a portion of the panel main body 48 of the dash panel 46; however, the present invention is not limited thereto. As shown in FIG. 8A, it may be configured to use a plate 80 that is formed separately from the panel main body 48 and is foamed of an iron plate or the like. In addition, as shown in FIG. 8B, it may be configured that a body airbag 82 is formed of the metallic sheet and in a bag shape. In this example, the body airbag 82 and the inflator 56 are attached to the plate 80, and the gas from the inflator 56 is supplied to the inside of the body airbag 82 through a communicating port that is not shown and is fanned in the body airbag 82.

In the above embodiment, it is configured that the body airbag 52 is disposed in the position to overlap with the dash cross member 50 when seen in the vehicle longitudinal direction; however, the present invention is not limited thereto. It may be configured that the body airbag 52 is disposed in a position that is dislocated from the dash cross member 50 when seen in the vehicle longitudinal direction. In addition, in the above embodiment, it is configured that the dash cross member 50 is fixed to a rear surface of the panel main body 48 of the dash panel 46; however, the present invention is not limited thereto. It may be configured that the dash cross member is fixed to a front surface of the panel main body of the dash panel. In this case, it is easy to directly fix the body airbag device to the dash cross member.

In the above embodiment, it is configured that the power unit 18 is disposed in front of the dash panel 46 in the vehicle body front section 14; however, the present invention is not limited thereto. For example, in a rear-engine rear-wheel-drive vehicle or the like, a spare tire and the like are disposed in a compartment in front of the dash panel. The present invention can also be applied to such a vehicle.

Various changes can be made to the present invention without departing from the scope thereof. Needless to say, the scope of rights of the present invention is not limited to the above embodiment.

What is claimed is:

1. A vehicle collision damage mitigation system comprising:
   a vehicle having a crashable zone on a front side of a dash panel in a vehicle longitudinal direction;
   a body airbag device that inflates a body airbag that is provided on a front surface of the dash panel by a pressure of gas generated by a gas generating device;
   a detector that detects whether a mode of a frontal collision of the vehicle is a full-overlap collision or another collision; and
   a control unit that operates the gas generating device when detecting a collision other than the full-overlap collision on the basis of a detection result of the detector and that does not operate the gas generating device when detecting the full-overlap collision.

2. The vehicle collision damage mitigation system according to claim 1, wherein
   the dash panel includes a dash cross member that is a frame member interposed between right and left front pillars of the vehicle, and
   the body airbag is disposed in a position to overlap with the dash cross member when seen in the vehicle longitudinal direction.

3. The vehicle collision damage mitigation system according to claim 1, wherein
   both ends of the body airbag in a vehicle width direction are respectively interposed between right and left suspension towers and the right and left front pillars of the vehicle.

4. The vehicle collision damage mitigation system according to claim 1, wherein
   the body airbag is formed of a metallic material.

5. The vehicle collision damage mitigation system according to claim 1 wherein
   the detector is configured by a right and left pair of collision sensors respectively attached to both sides in a front section of the vehicle, and
   the control unit compares deviation of input timing of signals from the right and left collision sensors as well as magnitudes of output signals from the right and left collision sensors, thereby determining whether the mode of the frontal collision is the full-overlap collision or another collision.

6. The vehicle collision damage mitigation system according to claim 1, wherein
the detector is configured by a front/rear acceleration sensor that detects acceleration in the vehicle longitudinal direction and a right/left acceleration sensor that detects acceleration in a vehicle horizontal direction, and
the control unit determines whether the mode of the frontal collision is the full-overlap collision or another collision on the basis of signals from the acceleration sensors.

7. The vehicle collision damage mitigation system according to claim 1, wherein
the dash panel includes a panel main body with the vehicle longitudinal direction as a panel thickness direction,
a dash cross member for reinforcing the panel main body is coupled to an intermediate portion in the up-and-down direction of the panel main body,
a portion of the panel main body to which the dash cross member is joined is formed with a rear swollen section that protrudes to the vehicle rear side,
The rear swollen section is formed to have an opened cross section in which a vehicle front side thereof is opened, and is also formed longitudinally along the vehicle width direction, and
a peripheral edge of the body airbag is joined to an opening edge of the rear swollen section.

8. The vehicle collision damage mitigation system according to claim 7, wherein
the body airbag has a cross section that is bent in a wave shape, and includes plural extra length sections that are aligned in the up-and-down direction.

9. The vehicle collision damage mitigation system according to claim 7, wherein
a sealed space is formed by the body airbag and the rear swollen section,
the inflator is provided in the sealed space,
a portion of the rear swollen section that faces the inflator is formed with an inflator housing section that is swollen to protrude to the vehicle body rear side, and the inflator is housed in the inflator housing section.

10. The vehicle collision damage mitigation system according to claim 1, wherein
the body airbag font's a sealed space together with a plate that is formed separately from the a panel main body that is included in the dash panel, and
the plate is formed of an iron plate.

11. The vehicle collision damage mitigation system according to claim 1, wherein
the body airbag is formed of the metallic sheet and in a bag shape.

* * * * *